UNITED STATES PATENT OFFICE.

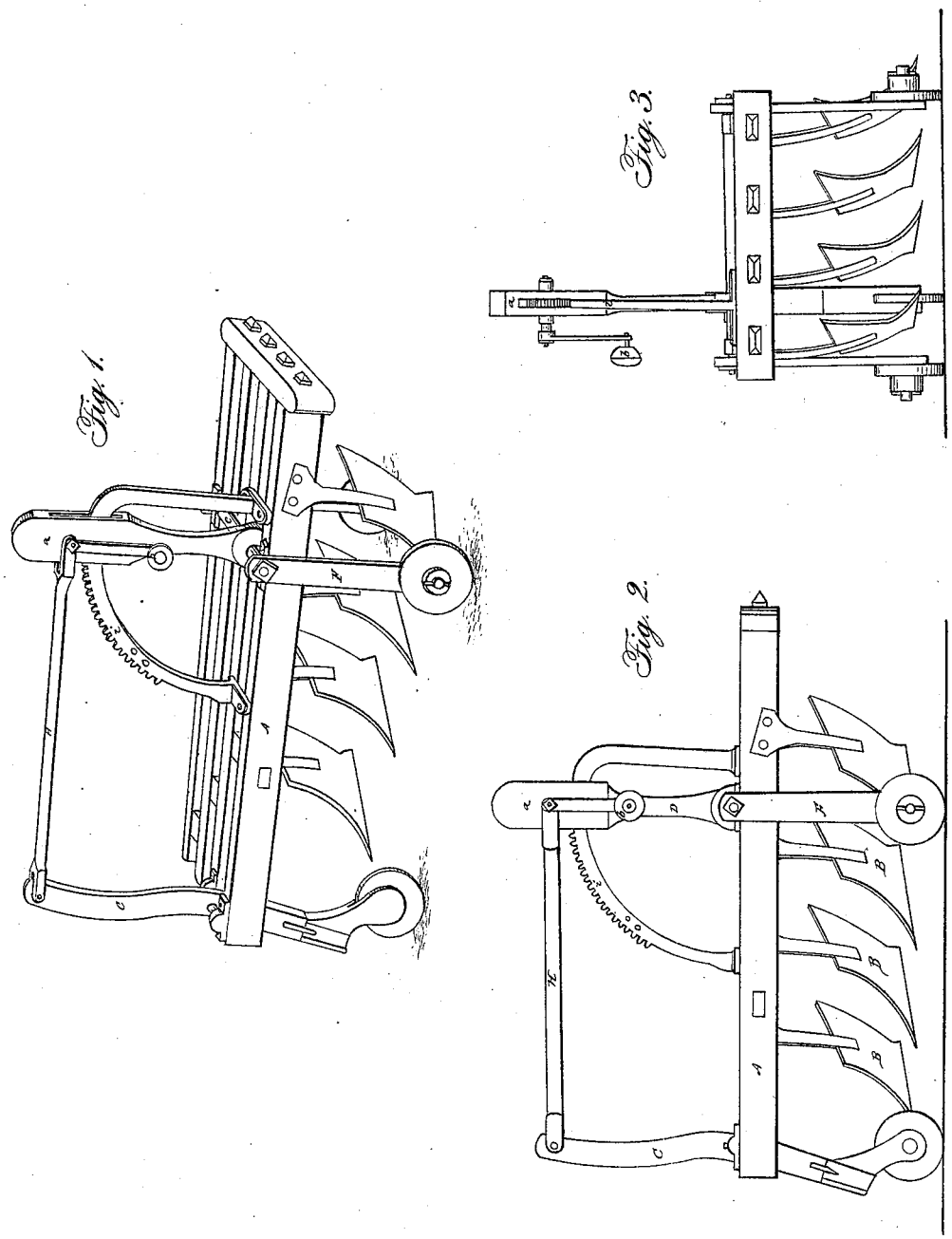

T. S. HEPTINSTALL, OF MENDOTA, ILLINOIS.

IMPROVEMENT IN GANG-PLOWS.

Specification forming part of Letters Patent No. 29,169, dated July 17, 1860.

*To all whom it may concern:*

Be it known that I, T. S. HEPTINSTALL, of Mendota, in the county of La Salle and State of Illinois, have invented certain new and useful Improvements in Gang-Plows; and I do hereby declare that the following is a full, clear, and exact description of the same, reference being had to the accompanying drawings, and to the letters of reference marked thereon.

The nature of my invention consists in the peculiar arrangement of the several parts hereinafter fully described.

In the annexed drawings, Figure 1 represents a perspective view. Fig. 2 is a longitudinal elevation. Fig. 3 is a transverse section.

In the figures, A represents a frame, which is constructed in any convenient and substantial manner.

B B represent a gang of plows, which are secured to the under side of the frame A in any of the known ways.

Across the rear of the frame is placed an axle, $e$, which rests in journal-boxes secured upon said frame. $a$ represents a lever secured to this shaft, which has an opening in it near its top, through which passes a curved rack-bar, $i$, and in which is secured a pinion, which is attached to an axle having its bearings in the sides of the opening made in said lever. The axle or shaft of the pinion is provided with a crank-handle, $b$. The pinion catches into the teeth of the rack-bar, and by turning the pinion the lever $a$ is caused to turn upon the axle $e$.

Secured to the axle $e$ are two crank-arms, which extend toward the ground, and which are provided with wheels, as represented, at their lower ends. The turning of the lever $a$ causes these arms to turn, by which means the wheels are brought against the ground and the plow-frame at this point elevated; or they are removed from the ground, thus letting the plows run deeper into the earth.

C is a lever secured to the front portion of the frame. To the lower end of this lever a caster-wheel is secured. The upper end of the lever is connected by means of a connecting-rod, H, to the lever $a$. By this arrangement it will be seen that when the pinion is turned the two levers move simultaneously, and serve to raise and lower the front and rear of the frame at the same time, and thus regulate the plows.

Having thus described my invention, what I claim is—

The peculiar arrangement of the frame A, plows B, arms F, with wheels attached, lever C, with caster-wheel on its lower end, connecting-rod H, lever $a$, curved rack $i$, and pinion $x$, operated by means of crank-handle $b$, when the several parts are connected substantially as and for the purpose specified.

T. S. HEPTINSTALL.

Witnesses:
    EDW. MENDEL,
    F. HOEHNE.